(No Model.)  4 Sheets—Sheet 1.
J. S. PESSENGER.
MACHINE FOR MAKING SPIKES, &c.
No. 422,151.  Patented Feb. 25, 1890.
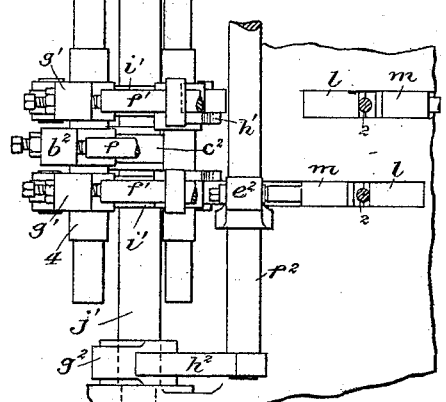
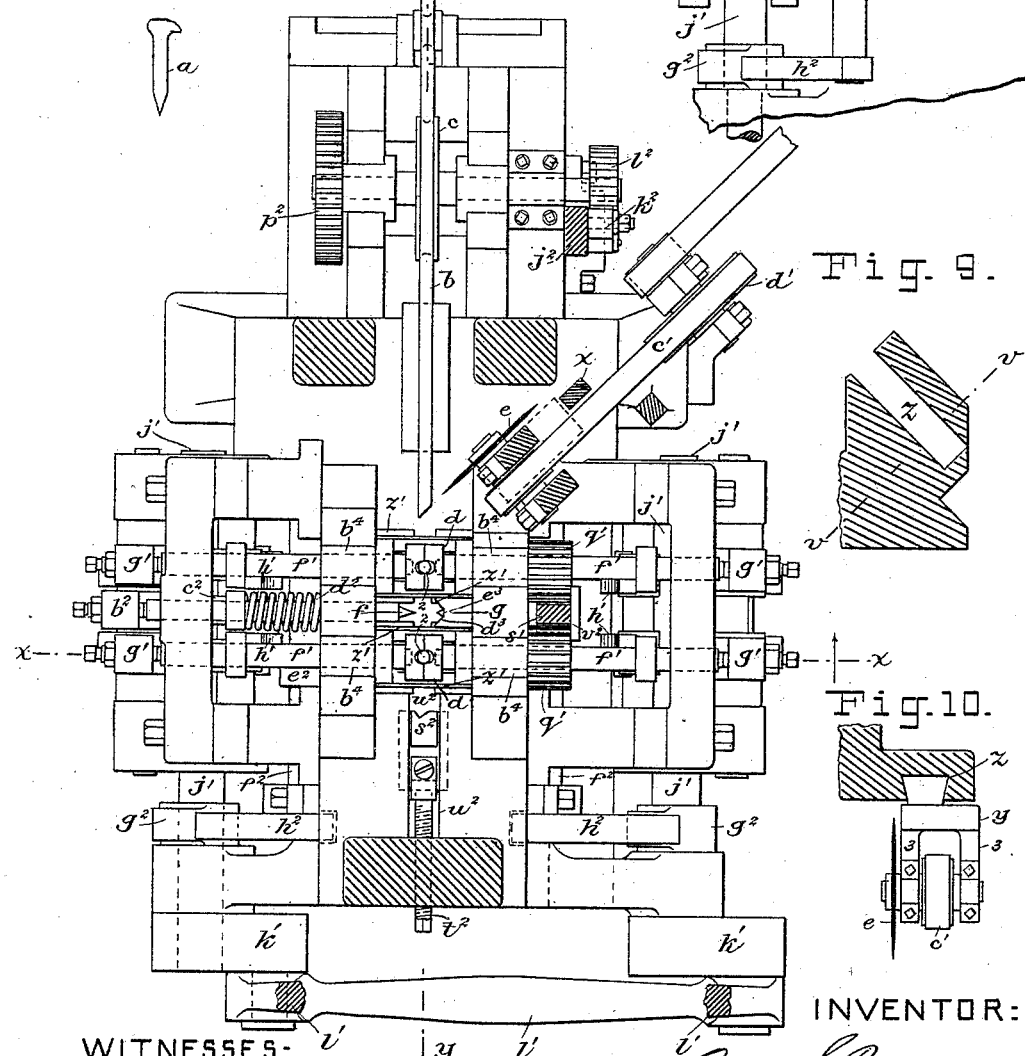
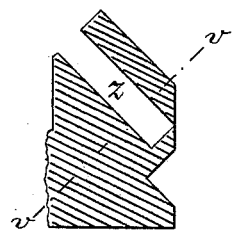
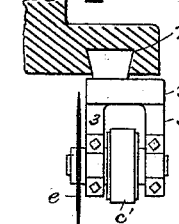
WITNESSES:
E. B. Bolton
O. J. Morgan
INVENTOR:
John S. Pessenger
By A. P. Thayer
his Attorney.

(No Model.) 4 Sheets—Sheet 2.
J. S. PESSENGER.
MACHINE FOR MAKING SPIKES, &c.
No. 422,151. Patented Feb. 25, 1890.

WITNESSES:
E. B. Bolton
H. J. Morgan

INVENTOR:
John S. Pessenger
By A. P. Thayer
his Attorney.

N. PETERS, Photo-Lithographer, Washington, D. C.

(No Model.) 4 Sheets—Sheet 3.
J. S. PESSENGER.
MACHINE FOR MAKING SPIKES, &c.

No. 422,151. Patented Feb. 25, 1890.

WITNESSES:
E. B. Bolton
C. H. Morgan

INVENTOR:
John S. Pessenger.
By A. P. Thayer.
his Attorney.

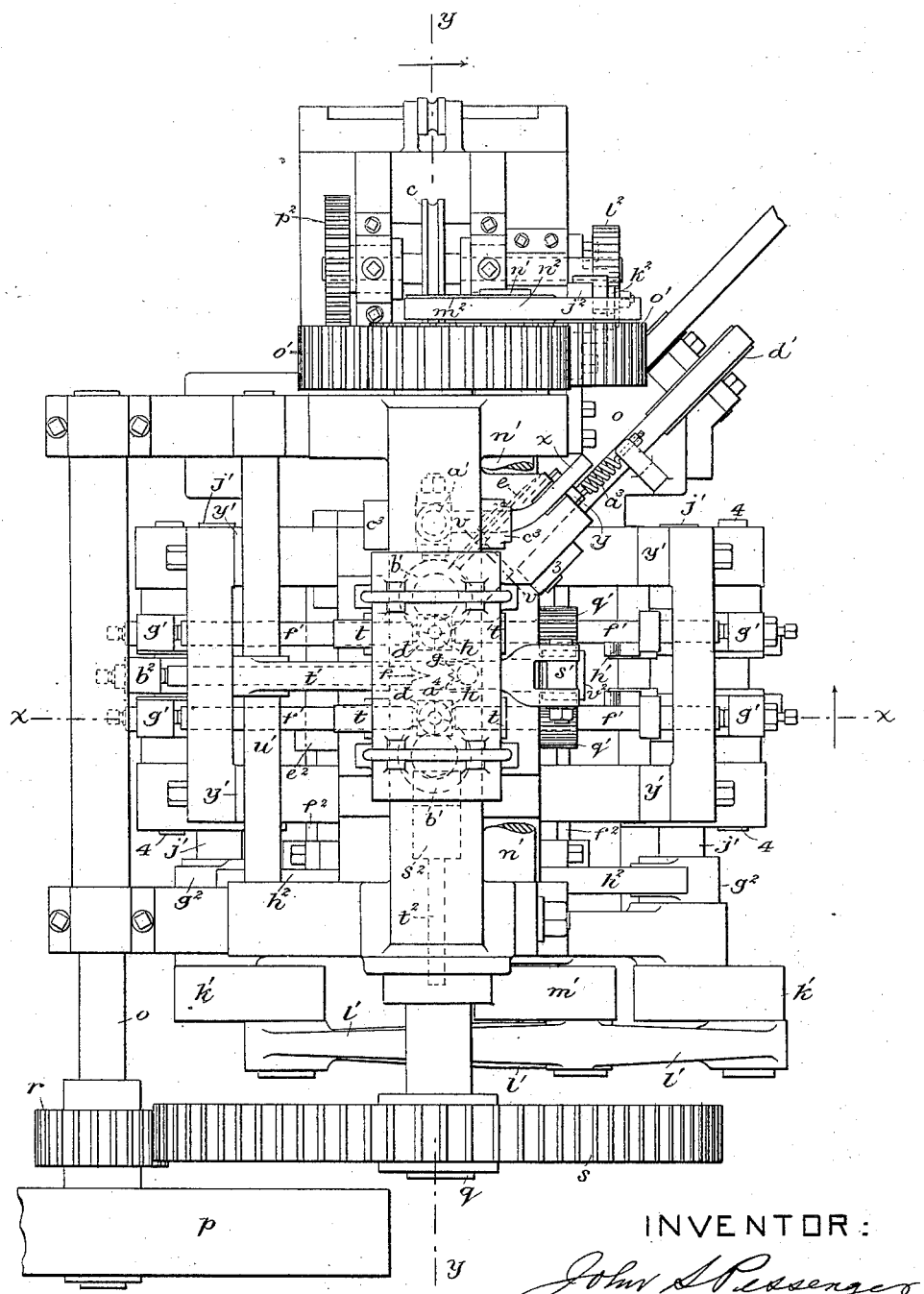

UNITED STATES PATENT OFFICE.

JOHN S. PESSENGER, OF BROOKLYN, NEW YORK, ASSIGNOR OF ONE-HALF TO FREDERICK C. TOMLINSON, OF CLOSTER, NEW JERSEY.

MACHINE FOR MAKING SPIKES, &c.

SPECIFICATION forming part of Letters Patent No. 422,151, dated February 25, 1890.

Application filed June 14, 1889. Serial No. 314,319. (No model.)

*To all whom it may concern:*

Be it known that I, JOHN S. PESSENGER, a citizen of the United States, residing at Brooklyn, in the county of Kings and State of New York, have invented certain new and useful Improvements in Machine for Making Spikes, Bolts, Rivets and other Like Articles; and I do hereby declare the following to be a full, clear, and exact description of the invention, such as will enable others skilled in the art to which it appertains to make and use the same.

My invention consists of improvements in machinery or apparatus more especially designed for making flat taper-pointed and hook-headed spikes, but also for making bolts, rivets, nails, and other like articles from hot rods.

The essential features of the invention relate to means for making two spikes, bolts, or other like articles from one rod at one and the same operation of the machine; also, to the means for making the flat points of the spikes without fins; also, to means for cutting off the blank pieces of which the two spikes or other articles are to be produced, and also to the means of making the hook-heads of the spikes, all as will be hereinafter fully described, reference being made to the accompanying drawings, in which—

Figures 2, 7, 8:
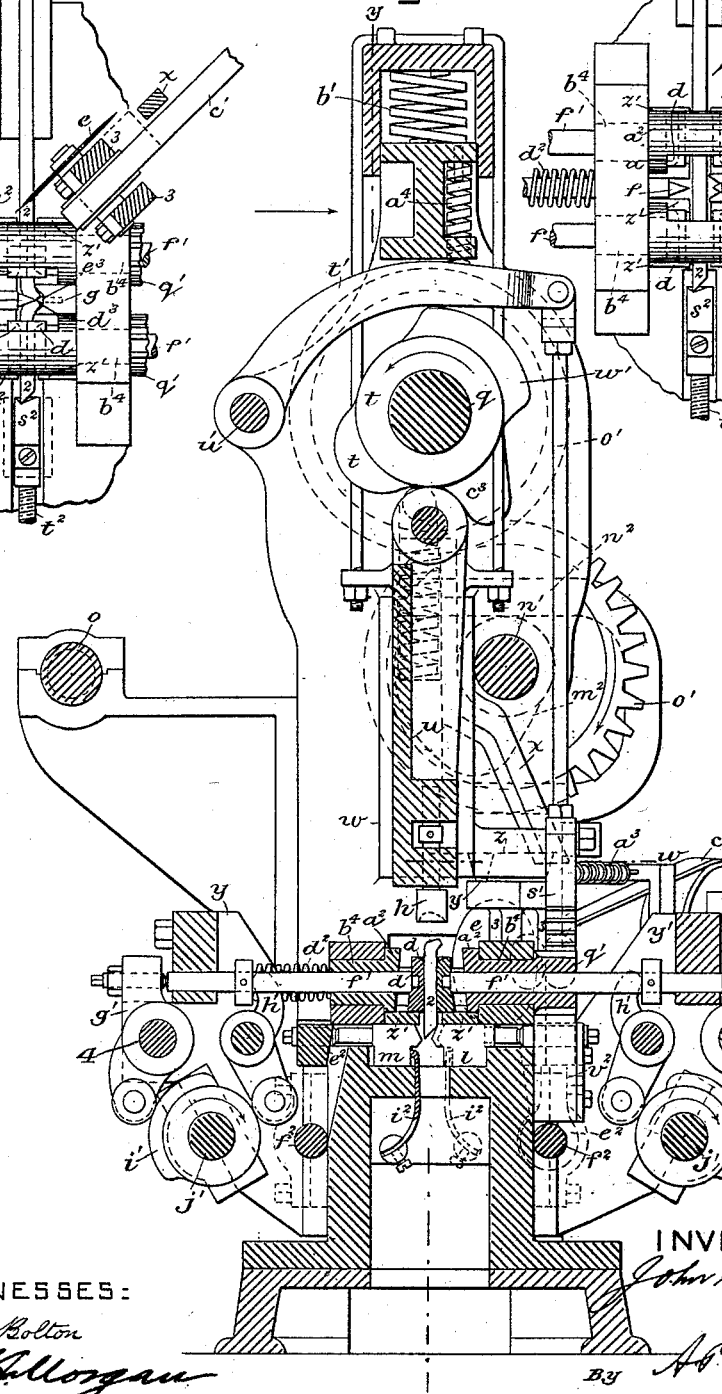
Figure 3:
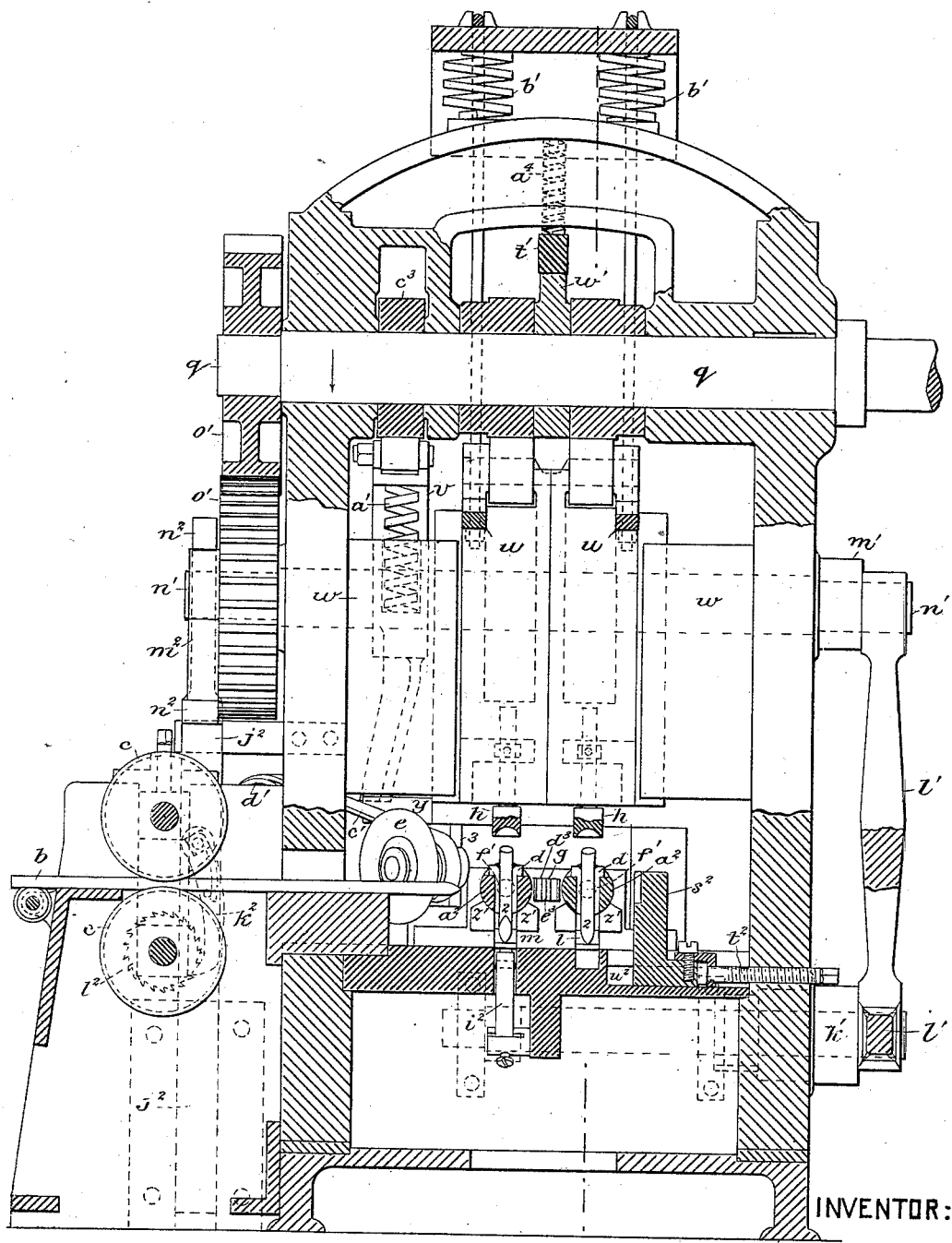

Figure 1 is partly a horizontal section and partly a plan view of my improved machine. Fig 2 is a sectional elevation on line $x\ x$ of Figs. 1 and 4. Fig. 3 is a sectional elevation on line $y\ y$ of Figs. 1, 2, and 4. Fig. 4 is a plan view, with one of the shafts broken off. Fig. 5 is a detail of some of the gripping and holding apparatus and some of the pointing apparatus in plan view, with a couple of spike or bolt blanks in section. Fig. 6 is a detail, partly in plan view and partly in section, showing the rod introduced between the open dies, ready to be clamped in the holding-dies and be cut apart for two spikes. Fig. 7 is similar to Fig. 6, but represents the rod after being clamped and cut, the dies being closed. Fig. 8 is a side view of a taper-pointed and hook-headed spike such as the machine represented in this example is arranged to produce. Fig. 9 is a detail in horizontal section on line $w\ w$, Fig. 2; and Fig. 10 is a vertical section on line $v\ v$, Figs. 4 and 9.

In the present example I have represented the machine as adapted for making flat taper-pointed hook-headed spikes $a$ from a hot rod $b$, which is to be supposed to issue from a muffler and pass directly to the feed-rolls $c$, having intermittent rotary motion as such feed-rolls usually operate, and being geared so as to have a range of movement at each operation equal to twice the length of the spike or bolts to be made. The rod is fed along between two pairs of divided and laterally opening and closing gripping-dies $d$, lying in the line of the feed movement one in advance of the other and a short distance apart when the feed movement takes place, as in Fig. 6, and closing on and gripping the rod soon as the feed movement ceases, each pair holding a part of the rod to be converted into a spike. The high-speed rotary knife-edged disk $e$ then advances diagonally on one side of the rod, cutting through it, partly by the advance and partly by the rotary movement, without flattening the metal or producing fins, and making points tapered all on one side. At the same time the reciprocating cutter $f$ advances on the rod between the two pairs of gripping and holding dies and cuts it apart on the anvil $g$ midway between the ends. (See Fig. 7.) The gripping and holding dies then turn upright, each pair with its blank 2 suitably projecting at the upper end for being headed thereat by the headers $h$, and with the lower end projecting into the space below to be centered between the stationary and movable point-centering dies $l\ m$, Figs. 1, 2, and 3. The gripping and holding dies, also the point-centering dies, then separate, the former a little in advance of the latter, and release the headed and pointed spike, which falls down below, and the gripping and holding dies then turn down to the horizontal position again, ready for reception of another piece of rod for further like operations. The power is applied to the main shaft $o$ by a belt on the large pulley $p$, and said shaft gears with the cam-shaft $q$ by the pinion $r$ on it and the large toothed wheel $s$ on said cam-shaft. The shaft $q$ forces down the headers $h$ by its cams $t$.

Said headers being carried in the sliding gate $u$, they are raised again by springs $b'$. Said shaft also forces down the slider $v$, arranged in a slideway $w$, dotted line, Fig. 3, of the housing, and having the lower slanting pusher $x$, which forces the disk cutter forward to cut off the rod, said cutter being carried on the slide $y$, arranged in the slideway $z$, and against the end of which the slanting pusher bears when so forced down, this being done by the cam $c^3$. This slider and the header-gate have retracting-springs $a'$ $b'$, respectively, for raising them for subsequent operations.

The cutter-slide $y$ is arranged to slide forward and backward diagonally to the line of the feedway, as shown, for cutting the rod diagonally, as before stated, the mandrel of said cutter being carried in bearings 3 thereon, between which the pulley for driving it receives a belt $c'$ from a driving-pulley $d'$, located at a suitable distance back of the feedway and in line with the slideway of the disk, and being suitably belted to any approved high-speed driver for speeding the disk up to a high rate for effective action as a rotary cutter, besides also serving as a sliding cutter. The cutter-slide works in the line of the belt $c'$, and applies the tension to the belt when shoved forward for cutting and allows the belt to slack off when it slides back. The back movement is partly effected by the belt; but spring $a^3$ is also employed for mainly causing the back movement.

The gripping-dies $d$ of each pair are respectively mounted in the die-holders $a^2$, so as to slide for opening and closing and to be shifted from one position to another. They are respectively fastened on the end of a sliding and partially-rotating rod $f'$, which rods are thrust forward to close the dies and grip the blanks by the levers $g'$, and are shifted backward to open the dies and discharge the completed spikes or bolts by the levers $h'$, said levers being operated by cams $i'$ on the shafts $j'$, which shafts are connected by cranks $k'$ and the triangular connecting-rod $l'$ with the crank $m'$ of the shaft $n'$, which is geared by the wheels $o'$ with the cam-shaft $q$.

The die-carriers $a^2$ consist of cylinders slotted at the middle and flattened on one side along the edges of the slot suitably to receive the dies and hold them by their heads against the thrusts of the headers $h$. They have journals $b^4$, by which they are seated in the bed-frame so as to turn, and pinions $q'$, by which they are turned, which are made integral with but may be attached to them, as preferred, and at the lower side they are provided with the concave seats $z'$ to support them against the thrusts of the headers.

The rods $f'$ will preferably be splined or feathered in the die-carriers to be turned by them as the dies turn, to which it is preferred to connect said rods rigidly; but their connection with the dies may be such that the rods need not turn.

The die-carriers $a^2$ are geared by pinions $q'$ with the vertically-reciprocating duplex-toothed rack $s'$, suspended from the arm $t'$, carried on a rock-shaft $u'$ and resting on the cam $w'$ on the cam-shaft $q$, to raise the rack. The down movement may be caused by the gravity of the rack, or the same and a spring $a^4$. The rack slides in the guide-box $v^2$.

The cam $t'$ is timed for turning the clamping-dies upright immediately after the cutting of the rod by the cutters $e$ and $f$, and to hold them so while the heading and pointing are effected and then shift said dies down into the horizontal position just prior to the next feed movement.

The cutter $f$, by which the piece of rod cut off by the disk cutter is parted at the middle and between the two pairs of clamping and holding dies, is arranged to slide in ways between the two die-rods $f'$ on the side opposite to the anvil $g$, and is thrust forward by the lever $b^2$, operated by cam $c^2$, Fig. 5, on the shaft $j'$ of that side of the machine, and adjusted to advance the cutter immediately after the dies $d$ have clamped the rod. The cam instantly releases the cutter-slide and the spring $d^2$ shifts the cutter back to allow the blanks freedom at the heads for being turned upright by the dies $d$. When hook-headed spikes are to be made, the anvil $g$ is preferably made with a notched face $d^3$ to allow the head portions of the blanks to be bent out of the line of the blanks in the act of cutting, as shown in Fig. 7, and the head-cavities of the grip and header dies are correspondingly offset from the lines of the grip-cavities to thus produce the heads with the hook projection at one side of the bodies of the spikes. The anvil is also provided with the stationary counter-cutter $e^3$ at the bottom of the notch to coact with movable cutter $f$ with better effect than if cutter $f$ were used alone.

The point-centering dies $l$ $m$ are located below the seats of the clamping-dies, so that the points of the spikes swing between them, as seen in Fig. 2, with the diagonal side fronting the stationary die $l$ and the straight side fronting the movable die $m$. The die $m$ then moves forward and bends and centers the point between the two. These dies $l$ $m$ have conversely-beveled faces adapted to produce central taper-points of the spikes by bending the oblique tapers produced by cutter $e$, so as to center them. The movable dies $m$ are moved forward by arms $e^2$ of rock-shafts $f^2$, which are operated by cams $g^2$ on shafts $j'$ and arms $h^2$ of the said rock-shafts. (See Figs. 1, 2, and 5.) The movable and stationary pointing-dies are respectively located on opposite sides of the machine and provided with such operating devices, respectively connected with the opposite shafts $j'$, these arrangements being necessary, because the diagonal points of the respective blanks are oppositely inclined. The dies $m$ are shifted back by springs $i^2$.

When bolts or other articles are to be made without taper-points, the point-centering dies will not be employed, nor will the disk cutter be arranged diagonally, but at right angles; or a common shear cutter may then be employed instead of said disk cutter.

The feed-rollers are operated by the vertical slide $j^2$, having a pawl $k^2$, (dotted in Fig. 3,) turning the ratchet-pinion $l^2$ on the lower feed-roll shaft when forced down by the cam $m^2$ on the end of shaft $n'$, said slide being coupled to the cam by a yoke $n^2$, and the upper and lower feed-rolls are geared together by the wheels $p^2$. This arrangement, however, is only to indicate a form of feed mechanism, and I do not limit myself to it. I may prefer to feed the blank rod by hand. While the feed-rolls will in practice be gaged to feed the rod forward just the length required for the spikes or bolts to be made, I have provided an adjustable stop $s^2$, having an adjusting-screw $t^2$ for setting at a position that will prevent the rod from being fed too far, said stop being fitted in a slideway $u^2$ in the line of the feed movement.

It will be seen that the rotating disk cutter separating the rod diagonally for the points and without changing the original shape of the metal or producing fins overcomes a serious present difficulty in the manufacture of spikes by the roll-dies of flattening them out unduly at the edges in rolling the tapers, and it also avoids the pulling or otherwise breaking the points apart, which always remain connected by a thin web, because the roll-dies cannot quite cut them apart, and, besides, it produces sharp finished points.

When only bolts, rivets, or other articles are to be made without taper-points, it is not essential to employ the duplicate clamping and holding and heading dies, although they may be used to advantage. They are specially applicable when taper-points are to be made and the diagonal cutter is used for cutting the blanks at one end and another cutter for cutting the other ends at right angles, the former cutting off lengths for two spikes and pointing both at the same time and the latter parting the two at the ends for the heads; but the duplicate arrangement is preferable for all forms of articles, because of the greater capacity of production, a directly transverse cutter being used in the place of the diagonal cutter.

While it is preferred to locate the diagonal cutter in advance of the dies, especially if the disk cutter is employed, it is to be understood that the intermediate cutter may be the one to make the oblique cuts and the advance cutter may make the right-angular cut, ordinary shear cutters being employed instead of the disk for the diagonal cuts, and the clamping and holding dies would turn in the opposite direction. Such ordinary shear cutting-dies may also be used for making the diagonal cuts in advance of the dies, but the disk cutter is preferred.

I claim as my invention—

1. The combination, with a heading-die located along the feedway and perpendicular thereto and a cutter located in advance of the header, of a pair of clamping and holding dies located coincidently with the header and being oscillable from and to the feedway and header-way, respectively, substantially as described.

2. The combination, with two heading-dies located side by side along the line of the feedway and perpendicularly thereto, of two pairs of clamping and holding dies located coincidently with the headers, respectively, and being oscillable from and to the feedway and header-ways, respectively, a cutter in advance of the dies, and an intermediate cutter, substantially as described.

3. The combination, with two heading-dies located side by side along the line of the feedway and perpendicularly thereto, of two pairs of clamping and holding dies located coincidently with the headers, respectively, and being oscillable from and to the feedway and header-ways, respectively, a cutter in advance of the dies, and an intermediate cutter, one of said cutters being arranged to cut the rod diagonally and produce taper-points and the other cutter arranged to cut the rod suitably for the heading of the blanks, substantially as described.

4. The combination, with two heading-dies located side by side along the line of the feedway and perpendicularly thereto, of two pairs of clamping and holding dies located coincidently with the headers, respectively, and being oscillable from and to the feedway and header-ways, respectively, a cutter located in advance of the dies and arranged to cut the rod obliquely and make taper-points, and an intermediate cutter arranged to cut the blanks for heading, substantially as described.

5. The combination, with two heading-dies located side by side along the line of the feedway and perpendicularly thereto, of two pairs of clamping and holding dies located coincidently with the headers, respectively, and being oscillable from and to the feedway and header-ways, respectively, a cutter in advance of the dies, and an intermediate cutter, one of said cutters being a rotary disk cutter arranged to cut the rod diagonally and produce taper-points and the other cutter arranged to cut the rod suitably for the heading of the blanks, substantially as described.

6. The combination, with two heading-dies located side by side along the line of the feedway and perpendicularly thereto, of two pairs of clamping and holding dies located coincidently with the headers, respectively, and being oscillable from and to the feedway and header-ways, respectively, a cutter in advance of the dies, and an intermediate cutter, one of said cutters being arranged to cut the rod diagonally and produce taper-points and the other cutter arranged to cut the rods suitably for the heading of the blanks, and point-centering dies, substantially as described.

7. The combination, with two heading-dies located side by side along the feedway and perpendicularly thereto, of two pairs of clamping and holding dies located coincidently with the headers, respectively, and being oscillable from and to the feedway and header-ways, respectively, a rotating disk cutter in advance of the dies, arranged to cut the rod obliquely and produce taper-points, and an intermediate cutter arranged to cut the rod suitably for the heading of the blanks, substantially as described.

8. The combination, with two heading-dies located side by side along the feedway and perpendicularly thereto, of two pairs of clamping and holding dies located coincidently with the headers, respectively, and being oscillable from and to the feedway and header-way, respectively, a rotating disk cutter in advance of the dies, arranged to cut the rod obliquely and produce taper-points, an intermediate cutter arranged to cut the rod suitably for the heading of the blanks, and point-centering dies, substantially as described.

9. The clamping and holding dies made in two parts, respectively connected to the oscillable and sliding rods, in combination with the die-holder, substantially as described.

10. The combination, with a cutter and a header located in the feedway and perpendicularly thereto, of the clamping and holding dies and die-holder located coincidently with the header and being oscillable from and to the feedway and header-way, respectively, and the seat supporting the die-holder and clamping-dies under the header, substantially as described.

11. The combination of the clamping and holding dies made in two parts, the reciprocating and oscillating rods, the die-holder carrying the said parts of the dies, the cam-levers and cams for reciprocating said rods, the toothed rack and pinion for oscillating said holder, and the header, substantially as described.

12. The combination of the clamping and holding dies made in two parts, the holder supporting the dies, the reciprocating and oscillating rods carrying the said parts of the dies, respectively, the seats supporting the holder and dies under the header, the cam-levers and cams for reciprocating said rods, the toothed rack and pinion for oscillating said dies, and the header, substantially as described.

13. The combination, with the clamping and holding dies and header, of the disk cutter arranged on a carrying-slide obliquely to the feedway, the wedge-slide for advancing the cutter, and means, substantially as described, for retracting the disk cutter.

14. The combination, with two heading-dies located side by side along the feedway and perpendicularly thereto, of two pairs of clamping and holding dies located coincidently with the headers, respectively, and being oscillable from and to the feedway and header-ways, respectively, a cutter in advance of the dies, and an intermediate cutter and the anvil therefor arranged to offset the head portions of the blank, and said header and holding-dies having the lateral head-sockets for making hook-heads, substantially as described.

15. The combination, with the holding and clamping dies and the sliding cutter, of the anvil having the offsetting notch for the head portions of the blanks, substantially as described.

16. The combination, with the holding and clamping dies and the sliding cutter, of the anvil having the offsetting notch for the head portions of the blanks, and the stationary counter-cutter, substantially as described.

In testimony whereof I affix my signature in presence of two witnesses.

JOHN S. PESSENGER.

Witnesses:
　W. J. MORGAN,
　W. B. EARLL.